United States Patent
Kato et al.

(10) Patent No.: US 9,256,084 B2
(45) Date of Patent: Feb. 9, 2016

(54) POLARIZATION BEAM SPLITTER

(71) Applicant: Infinera Corporation, Sunnyvale, CA (US)

(72) Inventors: Masaki Kato, Palo Alto, CA (US); Radhakrishnan L. Nagarajan, Cupertino, CA (US)

(73) Assignee: Infinera Corporation, Sunnyvale, CA (US)

( * ) Notice: Subject to any disclaimer, the term of this patent is extended or adjusted under 35 U.S.C. 154(b) by 172 days.

(21) Appl. No.: 13/675,583

(22) Filed: Nov. 13, 2012

(65) Prior Publication Data

US 2014/0133793 A1    May 15, 2014

(51) Int. Cl.
| | |
|---|---|
| *G02F 1/01* | (2006.01) |
| *G02B 6/126* | (2006.01) |
| *H04J 14/06* | (2006.01) |
| *G02B 6/12* | (2006.01) |

(52) U.S. Cl.
CPC ............... *G02F 1/011* (2013.01); *G02B 6/126* (2013.01); *G02B 6/12019* (2013.01); *G02B 6/12023* (2013.01); *H04J 14/06* (2013.01)

(58) Field of Classification Search
None
See application file for complete search history.

(56) References Cited

U.S. PATENT DOCUMENTS

| | | | |
|---|---|---|---|
| 7,356,206 B2 * | 4/2008 | Little | 385/11 |
| 7,505,640 B2 | 3/2009 | Little | |
| 2011/0150388 A1 * | 6/2011 | Shin et al. | 385/16 |

* cited by examiner

*Primary Examiner* — Tina Wong
(74) *Attorney, Agent, or Firm* — Harrity & Harrity LLP; David L. Soltz

(57) ABSTRACT

An optical system may include: a polarization beam splitter having: a first end having an input configured to receive multiple optical signals; a second end having a first output and a second output, where the first output may provide first components, having a first polarization of the multiple optical signals, and the second output may provide second components, having a second polarization, of the multiple optical signals; and a first waveguide having a first width and a second waveguide having a second width, where the first waveguide and the second waveguide may each have a length corresponding to a difference between the first width and the second width, where the first waveguide and the second waveguide may be configured to induce a phase shift of the plurality of optical signals based on the first width, the second width, and the length of the first waveguide and the second waveguide.

8 Claims, 9 Drawing Sheets

POLARIZATION BEAM SPLITTER

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrate circuit (PIC) having a transmitter component to provide a laser associated with each wavelength, a modulator configured to modulate the output of the laser, and a multiplexer to combine each of the modulated outputs (e.g., to form a combined output or WDM signal).

The multiplexer may include a first slab, a second slab, and waveguides connected to the first slab and the second slab. The first slab may receive multiple inputs (e.g., the modulated outputs from the transmitter component), each having a different wavelength. The first slab may include a propagation region (e.g., a free space) to allow the received inputs to propagate into respective first ends of the waveguides connected to the first slab. Additionally, the waveguides may each have different lengths, such that each waveguide applies a different phase shift to the received inputs. Further, the waveguides may supply the received inputs (e.g., through respective second ends of the waveguides) to the second slab. The received inputs may propagate in the free space, associated with the second slab, in such a way that the second slab supplies a single combined output (e.g., a WDM signal) associated with the received inputs. The multiplexer may be a shared multiplexer and supply two sets of WDM signals to a polarization beam combiner (PBC) on the transmitter circuit to combine the two sets of WDM.

A PIC is a device that integrates multiple photonic functions on a single integrated device. PICs may be fabricated in a manner similar to electronic integrated circuits but, depending on the type of PIC, may be fabricated using one or more of a variety of types of materials, including silica on silicon, silicon on insulator, and various polymers and semiconductor materials which are used to make semiconductor lasers, such as GaAs, InP, and their alloys.

A WDM system may also include a receiver circuit having a receiver (Rx) PIC. The receiver PIC may include a polarization beam splitter (PBS) to receive an optical signal (e.g., a WDM signal), split the optical signal, and provide two optical signals associated with the received optical signal. The receiver PIC may also include an optical demultiplexer circuit (referred to as a "demultiplexer") configured to receive the optical signals provided by the PBS and demultiplex each one of the optical signals into individual optical signals. Additionally, the receiver circuit may include receiver components to convert the individual optical signals into electrical signals, and output the data carried by those electrical signals.

The demultiplexer may include a first slab, a second slab, and waveguides connected to the first slab and the second lab. The first slab may receive an input (e.g., a WDM signal outputted by a multiplexer). The received input may include optical signals, each having a different wavelength. The first slab may include a propagation region (e.g., a free space) to allow multiple optical signals, associated with the received input, to propagate into respective first ends of the waveguides connected to the first slab. Additionally, the waveguides may each have different lengths, such that each waveguide is configured to apply a different phase shift to the multiple optical signals associated with the received input. Further, the waveguides may supply the multiple optical signals (e.g., through respective second ends of the waveguides) to the second slab. The multiple optical signals may propagate through the free space, associated with the second slab, in such a way that the second slab supplies the multiple optical signals associated with the received input.

The transmitter (Tx) and receiver (Rx) PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel grid for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs.

SUMMARY

According to one example implementation, an optical system may include a polarization beam splitter having: a first end having a first coupler with an input configured to receive multiple optical signals, where each of the multiple optical signals may have a corresponding one of multiple wavelengths; and a second end having a second coupler with a first output and a second output, where the first output may provide first components of the multiple optical signals, each of the first components may have a first polarization, and the second output may provide second components of the multiple optical signals, each of the second components having a second polarization.

The polarization beam splitter may further include a first waveguide and a second waveguide, where each of the first waveguide and the second waveguide may have: a first end connected to the first coupler, and a second end connected to the second coupler, and the first waveguide may have a first width and the second waveguide may have a second width, where the first waveguide and the second waveguide may each have a length corresponding to a difference between the first width and the second width, the first waveguide and the second waveguide may be configured to induce a phase shift of the multiple optical signals based on the first width, where the second width, and the length of the first waveguide and the second waveguide, the second end of the polarization beam splitter may be configured to provide the first components, via the first output, and the second components, via the second output, in accordance with the phase shift of the multiple optical signals generated by the first waveguide and the second waveguide.

According to another example implementation, an optical system may include a polarization beam splitter having: a first end having a first coupler with an input configured to receive multiple optical signals, each of the multiple optical signals having a corresponding one of multiple wavelengths; and a second end having a second coupler with a first output and a second output, the first output providing first components of the multiple optical signals, each of the first components having a first polarization, and the second output providing second components of the multiple optical signals, each of the second components having a second polarization.

The polarization beam splitter may further include a first waveguide and a second waveguide, each of the first waveguide and the second waveguide having: a first end connected to the first coupler, and a second end connected to the second coupler, and the first waveguide having a first width and the second waveguide having a second width, the first waveguide and the second waveguide each having a length corresponding to a difference between the first width and the second width, the first waveguide and the second waveguide being configured to induce a phase shift of the multiple optical signals based on the first width, the second width, and the length of the first waveguide and the second waveguide, the second end of the polarization beam splitter configured to provide the first components, via the first output, and the second components, via the second output, in accordance with the phase shift of the multiple optical signals generated by the first waveguide and the second waveguide.

The optical system may further include a rotator comprising: an input which may receive the first components, where the rotator may be configured to rotate the first polarization so that each of the first components has the second polarization, and where the rotator may output the first components as rotated first components; a substrate; an optical multiplexer circuit or optical demultiplexer circuit provided on the substrate; a first path which may receive the rotated first components, where the first path may provide the rotated first components to the optical multiplexer circuit or the optical demultiplexer circuit; and a second path which may receive the second components, where the second path may provide the second components to the optical multiplexer circuit or the optical demultiplexer circuit.

According to another example implementation, a polarization beam splitter may have a first end having a first coupler with an input configured to receive multiple optical signals, where each of the multiple optical signals may have a corresponding one of multiple wavelengths; and a second end having a second coupler with a first output and a second output, where the first output may provide first components of the multiple optical signals, each of the first components may have a first polarization, and the second output may provide second components of the multiple optical signals, each of the second components having a second polarization that is different from the first polarization.

The polarization beam splitter may further include a first waveguide and a second waveguide, where each of the first waveguide and the second waveguide may have: a first end connected to the first coupler, and a second end connected to the second coupler, and the first waveguide may have a first width and the second waveguide may have a second width, the first waveguide and the second waveguide may each have a length, where the first waveguide and the second waveguide may be configured to induce a phase shift of the multiple optical signals based on the first width, the second width, and the length of the first waveguide and the second waveguide, where the second end of the polarization beam splitter may be configured to provide the first components, via the first output, and the second components, via the second output, in accordance with the phase shift of the multiple optical signals generated by the first waveguide and the second waveguide.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the disclosure.

Some implementations described herein may provide a polarization beam splitter (PBS) that receives an optical signal having first components with a first polarization (e.g., a transverse magnetic (TM) polarization) and second components having a second polarization (e.g., a transverse electric (TE) polarization). In some implementations, the PBS may supply a first output optical signal having the first components and a second output optical signal having the second components to a demultiplexer or to some other optical component.

In some implementations, the PBS may have a first coupler, a second coupler, and first and second waveguides connecting the first coupler and the second coupler. The first waveguide may have a first width and the second waveguide may have a second width. In some implementations, the first waveguide and the second waveguide may have a common length based on a difference between the first width and the second width.

In some implementations, the PBS may supply the first output optical signal having the first components and the second output optical signal having the second components as a result of the first width, the second width, and the length. For example, the difference between the first width and the second width may induce a phase shift between the first components and the second components to form the first output optical signal having the first components and the second output optical signal having the second components. As a result, the PBS may provide two optical signals, associated with a single input optical signal, to one or more optical components (e.g., a rotator, a demultiplexer, etc.) thereby increasing capacity for an associated receiver module of the PBS. Further, the size of the PBS may be reduced by reducing the length of the first and second waveguides based on the difference between the first width and the second width.

While the first polarization may be described herein as the TM polarization and the second polarization may be described herein as the TE polarization, in some other implementations, the first polarization may correspond to the TE polarization and the second polarization may correspond to the TM polarization.

Figure 1:
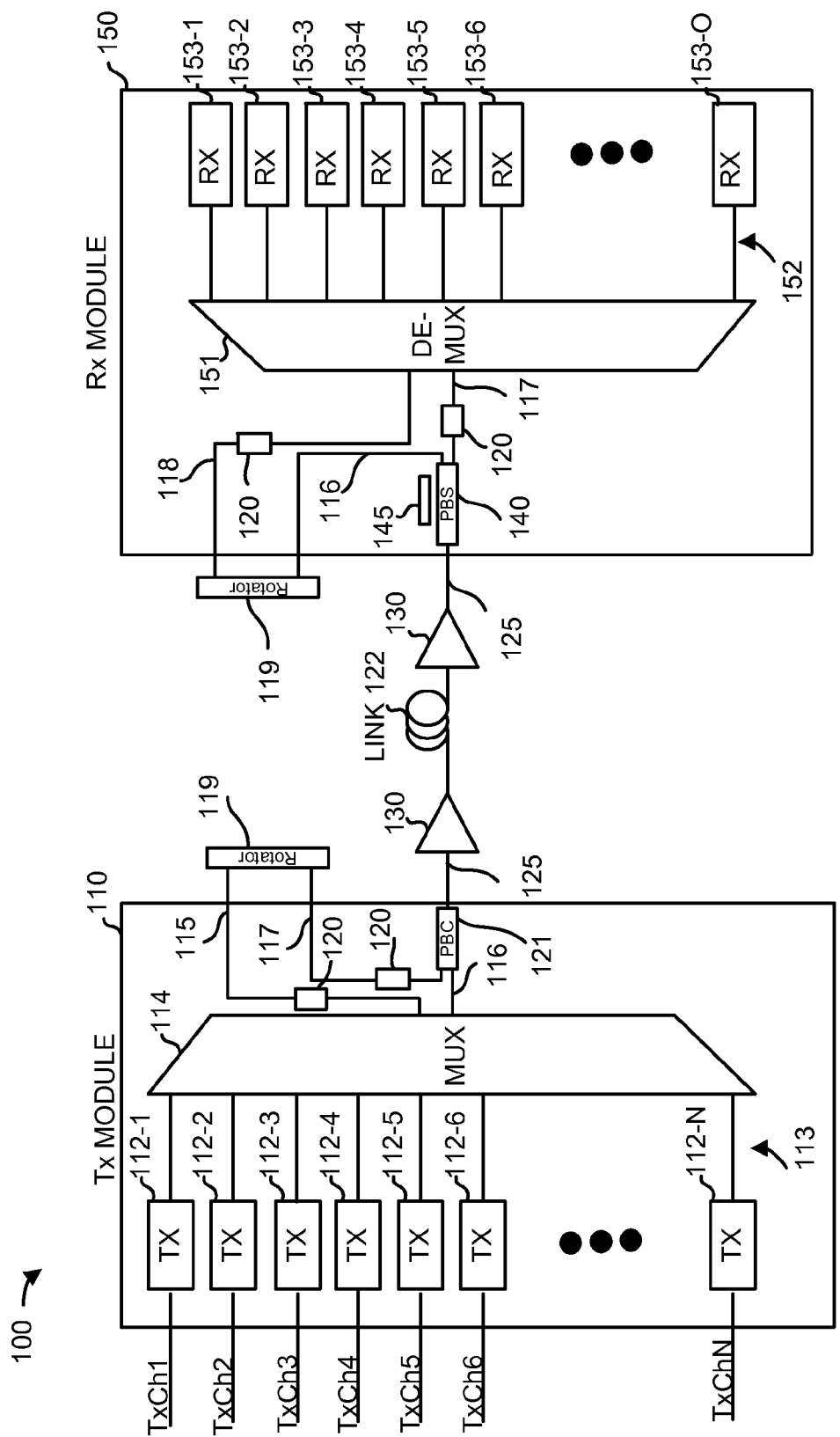
FIG. 1 is a diagram of an example network in which systems and/or methods may be implemented.

FIG. 1 is a diagram of an example network 100 in which systems and/or methods described herein may be implemented. In practice, network 100 may include additional, fewer, or differently arranged components than are shown in FIG. 1.

As illustrated in FIG. 1, network 100 may include transmitter (Tx) module 110 (e.g., a Tx PIC), rotators 119, and/or receiver (Rx) module 150 (e.g., an Rx PIC). In some implementations, transmitter module 110 may be optically connected to receiver module 150 via link 122, optical amplifiers 130, and/or PBS 140. Link 122 may include one or more optical amplifiers 130 that amplify an optical signal as the optical signal is transmitted over link 122.

Transmitter module 110 may include a number of optical transmitters 112-1 through 112-N (where N≥1), waveguides 113, optical multiplexer 114, polarizers 120, and/or polarization beam combiner (PBC) 121. Each optical transmitter 112 may receive a data channel (TxCh1 through TxChN), modulate the data channel with an optical signal, and transmit the data channel as an optical signal. In one implementation, transmitter module 110 may include 5, 10, 20, 50, 100, or some other number of optical transmitters 112. Each optical transmitter 112 may be tuned to use an optical carrier of a designated wavelength. It may be desirable that the grid of wavelengths emitted by optical transmitters 112 conform to a known standard, such as a standard published by the Telecommunication Standardization Sector (ITU-T).

In some implementations, each of optical transmitters 112 may include a laser, a modulator, a semiconductor optical amplifier (SOA), a light emitting diode (LED), and/or some other components. The laser, modulator, and/or SOA may be coupled with a tuning element (e.g., a heater) that can be used to tune the wavelength of the optical signal channel output by the laser, modulator, or SOA. In some implementations, a single laser may be shared by multiple optical transmitters 112.

Waveguides 113 may include an optical link to transmit modulated outputs (referred to as "signal channels") of optical transmitters 112. In some implementations, each optical transmitter 112 may connect to one waveguide 113 or to multiple waveguides 113 to transmit signal channels of optical transmitters 112 to optical multiplexer 114. In some implementations, waveguides 113 may be birefringent (e.g., based on the width of waveguides 113).

Optical multiplexer 114 may include an arrayed waveguide grating (AWG) or some other multiplexing device. In some implementations, optical multiplexer 114 may combine multiple signal channels, associated with optical transmitters 112, into wave division multiplexed (WDM) signals, such as optical signals 115 and 116. In some implementations, optical multiplexer 114 may include an input (e.g., a first slab to receive signal channels) and an output (e.g., a second slab to supply WDM signals, such as optical signals 115 and 116, associated with input signal channels). Optical multiplexer 114 may also include waveguides connecting the input and the output. In some implementations, the first slab and the second slab may each act as an input and an output. For example, the first slab and the second slab may each receive multiple signal channels. The first slab may supply a single WDM signal corresponding to the signal channels received by the second slab. The second slab may supply a single optical signal (e.g., a WDM signal) corresponding to the signal channels received by the first slab. As shown in FIG. 1, optical multiplexer 114 may receive signal channels outputted by optical transmitters 112, and output optical signals 115 and 116. Optical signals 115 and 116 may each include one or more optical signals, such that each optical signal includes one or more wavelengths.

Rotator 119 may include an optical device or a collection of optical devices. In some implementations, rotator 119 may receive an optical signal with components having a first polarization (e.g., a transverse magnetic (TM) polarization), rotate the polarization of the components, associated with the optical signal, and supply an optical signal with rotated components having a second polarization (e.g., a transverse electric (TE) polarization).

In some implementations, rotator 119 may be associated with transmitter module 110. Rotator 119 may receive components associated with optical signal 115 having a first polarization (e.g., a TM polarization), and supply optical signal 117 with rotated components having a second polarization (e.g., a TE polarization). As shown in FIG. 1, rotator 119 may supply optical signal 117 to PBC 121.

As described above, rotator 119 may be capable of receiving multiple sets of components associated with multiple optical signals and supplying multiple sets of rotated components associated with the received components. As shown in FIG. 1, rotator 119 may be located separate and/or detached from receiver module 150. Similarly, rotator 119 may be located separate and/or detached from transmitter module 110.

Polarizer 120 may include an optical device, or a collection of optical devices. In some implementations, polarizer 120 may receive an optical signal, and may absorb components of the optical signal having a particular polarization, such as a first polarization (e.g., a TM polarization) or a second polarization (e.g., a TE polarization). In some implementations, polarizers 120 may be associated with transmitter module 110 and may receive optical signal 115 supplied by optical multiplexer 114 and/or optical signal 117 supplied by rotator 119.

In some implementations, polarizers 120 may absorb residual components of optical signal 117 having the first polarization. For example, as described above rotator 119 may rotate components associated with optical signal 115 having the first polarization, to supply optical signal 117 with components having the second polarization. Optical signal 117 may include residual components associated with the first polarization. Polarizer 120 may be connected along a path associated with optical signal 117 to absorb the residual components associated with the first polarization, thereby absorbing components having an undesirable polarization. Similarly, polarizer 120 may be connected along a path associated with optical signal 115 to absorb components having an undesirable polarization.

PBC 121 may include an optical device, or a collection of optical devices. In some implementations, PBC 121 may receive multiple optical signals and supply a combined optical signal (e.g., a WDM signal, or some other type of optical signal). For example, as shown in FIG. 1, PBC 121 may receive optical signal 116 and optical signal 117. PBC 121 may supply optical signal 125 based on receiving optical signals 116 and 117. In some implementations, optical signal 125 may include a combined WDM signal associated with optical signal 116 and/or optical signal 117.

As further shown in FIG. 1, receiver module 150 may include polarizers 120, PBS 140, heater 145, optical demultiplexer 151, waveguides 152, and/or optical receivers 153-1 through 153-O (where O≥1). In some implementations, rotator 119 may be associated with receiver module 150 and may receive components associated with optical signal 116 having a first polarization (e.g., a TM polarization), and supply optical signal 118 with rotated components having a second polarization (e.g., a TE polarization). As shown in FIG. 1, rotator 119 may supply optical signal 118 to optical demultiplexer 151.

Receiver module 150 may include polarizers 120 to receive optical signal 117 supplied by PBS 140 and/or optical signal 118 supplied by rotator 119. In a similar manner as described above, polarizers 120 may absorb components of optical signal 118 having the first polarization (e.g., residual components of optical signal 118 having the first polarization when rotator 119 supplies optical signal 118). Similarly, polarizer 120 may be connected along a path associated with optical signal 117 to absorb components having an undesirable polarization.

PBS 140 may include an optical device or a collection of optical devices. In some implementations, PBS 140 may receive an input optical signal (e.g., optical signal 125 or some other signal), and supply output components associated with the input optical signal (e.g., via a first output and/or a second output of PBS 140). As shown in FIG. 1, PBS 140 may receive optical signal 125 supplied by PBC 121 (e.g., via link 122). PBS 140 may supply components, associated with optical signal 125, (e.g., via a first output and a second output), such as components associated with optical signal 116 (also referred to as "first components 116"), and/or components associated with optical signal 117 (also referred to as "second components 117"). In some implementations, PBS 140 may supply first components 116 to rotator 119, and supply second components 117 to optical demultiplexer 151. First components 116 may be associated with a first polarization (e.g., a TM polarization) while second components 117 may be associated with a second polarization (e.g., a TE polarization).

Heater 145 may include a heating device or a collection of heating devices. In some implementations, heater 145 may be provided adjacent to PBS 140 to tune the indices of first components 116 and/or second components 117 (e.g., to align first components 116 and/or second components 117 with PBS 140).

In some implementations, optical demultiplexer 151 may include an AWG or some other device. Optical demultiplexer 151 may supply multiple signal channels based on receiving a WDM signal (e.g., optical signal 125), or components associated with the WDM signal. For example, optical demultiplexer 151 may include an input (e.g., a first slab region to receive second components 117, optical signal 118 (referred to as "rotated components 118"), and/or some other input component), and an output (e.g., a second slab region to supply multiple signal channels associated with the input). Optical demultiplexer 151 may include waveguides connecting the input and the output. In some implementations, the first slab and the second slab may each act as an input and an output. For example, the first slab and the second slab may each receive components associated with a WDM signal. The first slab may supply signal channels corresponding to the components received by the second slab. The second slab my supply signal channels corresponding to the components received by the first slab. As shown in FIG. 1, optical demultiplexer 151 may supply signal channels to optical receivers 153 via waveguides 152.

Waveguides 152 may include optical links to transmit outputs of optical demultiplexer 151 to optical receivers 153. In some implementations, each optical receiver 153 may receive outputs via a single waveguide 152 or via multiple waveguides 152. In some implementation waveguides 152 may be birefringent (e.g., based on the width of waveguides 152).

Optical receivers 153 may each operate to convert the input optical signal to an electrical signal that represents the transmitted data. In some implementations, optical receivers 153 may each include one or more photodetectors and/or related devices to receive respective input optical signals outputted by optical demultiplexer 151 and a local oscillator, convert the signals to a photocurrent, and provide a voltage output to function as an electrical signal representation of the original input signal.

While FIG. 1 shows a particular configuration of components in network 100, in practice, network 100 may include additional components, different components, or differently arranged components than what are shown in FIG. 1.

Figure 2A:
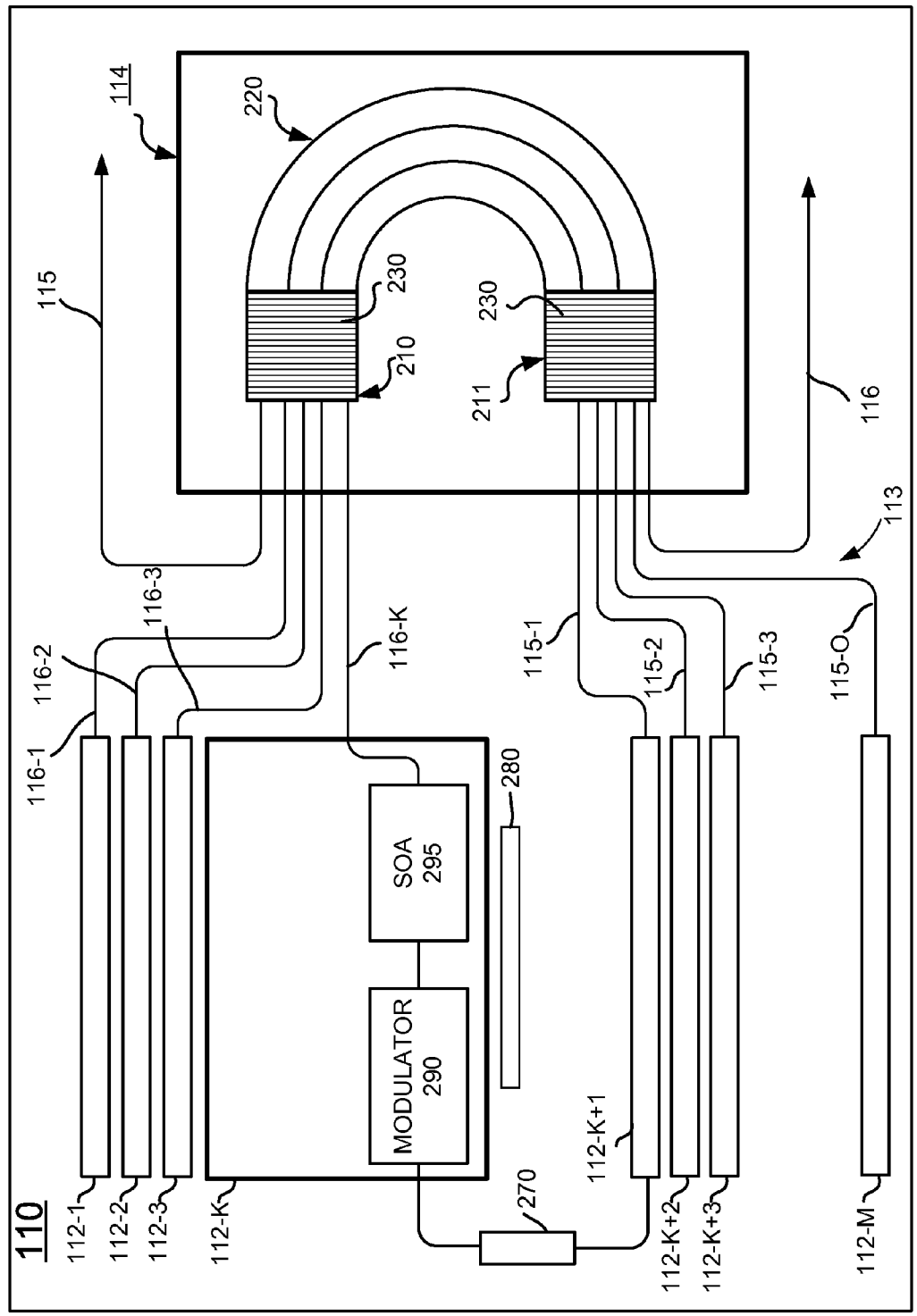
FIG. 2A is a diagram illustrating example components of a transmitter module as shown in FIG. 1.

FIG. 2A is a diagram illustrating example elements of transmitter module 110 shown in network 100 of FIG. 1. As shown in FIG. 2A, transmitter module 110 may include optical transmitters 112, waveguides 113, heater 280, and optical multiplexer 114. As described above, optical transmitters 112 may include laser 270, heater 280, modulator 290, and/or SOA 295.

Laser 270 may include a semiconductor laser, such as a distributed feedback (DFB) laser, or some other type of laser. Laser 270 may provide an output optical light beam to modulator 290. In some implementations, laser 270 may be an optical source for a single corresponding optical transmitter 112. In some implementations, laser 270 may be an optical source that is shared by multiple optical transmitters 112.

Heater 280 may include a heating device, or a collection of heating devices. In some implementations, heater 280 may be located adjacent to optical transmitter 112 such that heater 280 may tune a wavelength of an optical signal channel associated with laser 270, modulator 290, or SOA 295.

Modulator 290 may include an optical modulator such as an electro-absorption modulator (EAM), or some other type of modulator. Modulator 290 may control (modulate) the intensity of an input optical light beam (e.g., supplied by laser 270), based on an input voltage signal (e.g., signals provided over TxCh1 through TxChN). Modulator 290 may be formed as a waveguide with electrodes for applying an electric field, based on the input voltage signal, in a direction perpendicular to the light beam. Alternatively, modulator 290 may be implemented based on other modulation technologies, such as electro-optic modulation.

SOA 295 may include an amplifying device, or a collection of amplifying devices. In some implementations, SOA 295 may include an amplifier that may directly amplify an input optical signal (e.g., a signal supplied by laser 270). In some implementations, SOA 295 may be replaced by a variable optical attenuator (VOA), or by an element that combines both an SOA and a VOA.

Waveguides 113 may include individual waveguides associated with individual signal channels outputted by optical transmitters 112. For example, waveguides 113 may include corresponding waveguides to transmit signal channels 116-1, 116-2, 116-3 . . . 116-K (where K≥1) supplied by optical transmitters 112-1, 112-2, 112-3 . . . 112-K, respectively. Further, waveguides 113 may include corresponding waveguides to transmit signal channels 115-1, 115-2, 115-3 . . . 115-O (where O≥1) supplied by optical transmitters 112-K+1, 112-K+2, 112-K+3 . . . 112-M).

Optical multiplexer 114 may include slab 210, slab 211, and/or waveguides 220 connected to slabs 210 and 211. In some implementations, slabs 210 and 211 may each include an input and an output. For example, slab 210 may receive one or more inputs (e.g., signal channels 116-1 through 116-K), and slab 211 may receive one or more inputs (e.g., signal channels 115-1 through 115-O). Waveguides 220 may supply slab 210 with a combined WDM signal (e.g., optical signal 115) associated with the inputs of slab 211. Further, waveguides 220 may supply slab 211 with a combined WDM signal (e.g., optical signal 116) associated with the inputs of slab 210.

For example, slabs 210 and 211 may each include a free-space region (e.g., a propagation region). The free-space regions of slabs 210 and 211 may allow the wavelengths, associated with input signals, to propagate freely. Slab 210 may receive signal channels 116-1 through 116-K, thereby allowing the signal channels to propagate in the free-space region of slab 210. Waveguides 220 may guide individual signal channels associated with the signal channels and supply a combined WDM signal (e.g., optical signal 116) to slab 211. Slab 211 may receive signal channels from optical transmitters 115-1 through 115-O, thereby allowing the received signal channels to propagate in the free-space region of slab 211. Waveguides 220 may guide individual signal channels associated with the received signal channels and supply a combined WDM signal (e.g., optical signal 115) to slab 210. In some implementations, optical multiplexer 114 may supply optical signals 115 and 116 to optical demultiplexer 151 (e.g., via link 122).

In some other implementations, slab 210 and/or slab 211 may include an input, but may not include an output. Alternatively, slab 210 and/or 211 may include an output, but may not include an input. For example, slab 210 may include an input to receive signal channels 116-1 through 116-K. Slab 211 may include an output to supply a combined WDM signal (e.g., optical signal 116) associated with the inputs of slab 210. Alternatively, slab 211 may include an input to receive signal channels 115-1 through 115-O. Slab 210 may include an output to supply a combined WDM signal (e.g., optical signal 115) associated with the inputs of slab 211.

In some implementations, slab 210 and/or slab 211 may include material 230 (e.g., to form a polarizer on the respective slab). Material 230 may include a metal, or a metal composite, such gold, titanium, and/or some other material. Material 230 may absorb components of a signal channel, WDM signal, and/or some other optical signal having a particular polarization (e.g., a TE or TM polarization) when the signal channel passes through the respective slab having material 230. For example, as described above, slabs 210 and 211 may receive signal channels from optical transmitters 112, and may supply combined optical signals 115 and 116 (e.g., WDM signals). Material 230 may absorb components of the received signal channels having a particular polarization (e.g., a TE or TM polarization). Further, material 230 may absorb components of optical signal 115 and/or optical signal 116 having a particular polarization.

While particular elements of transmitter module 110 are shown in FIG. 2A, in practice, the example implementations of transmitter module 110, shown in FIG. 2A, may include additional elements, fewer elements, or differently arranged elements than are shown in FIG. 2A.

Figure 2B:
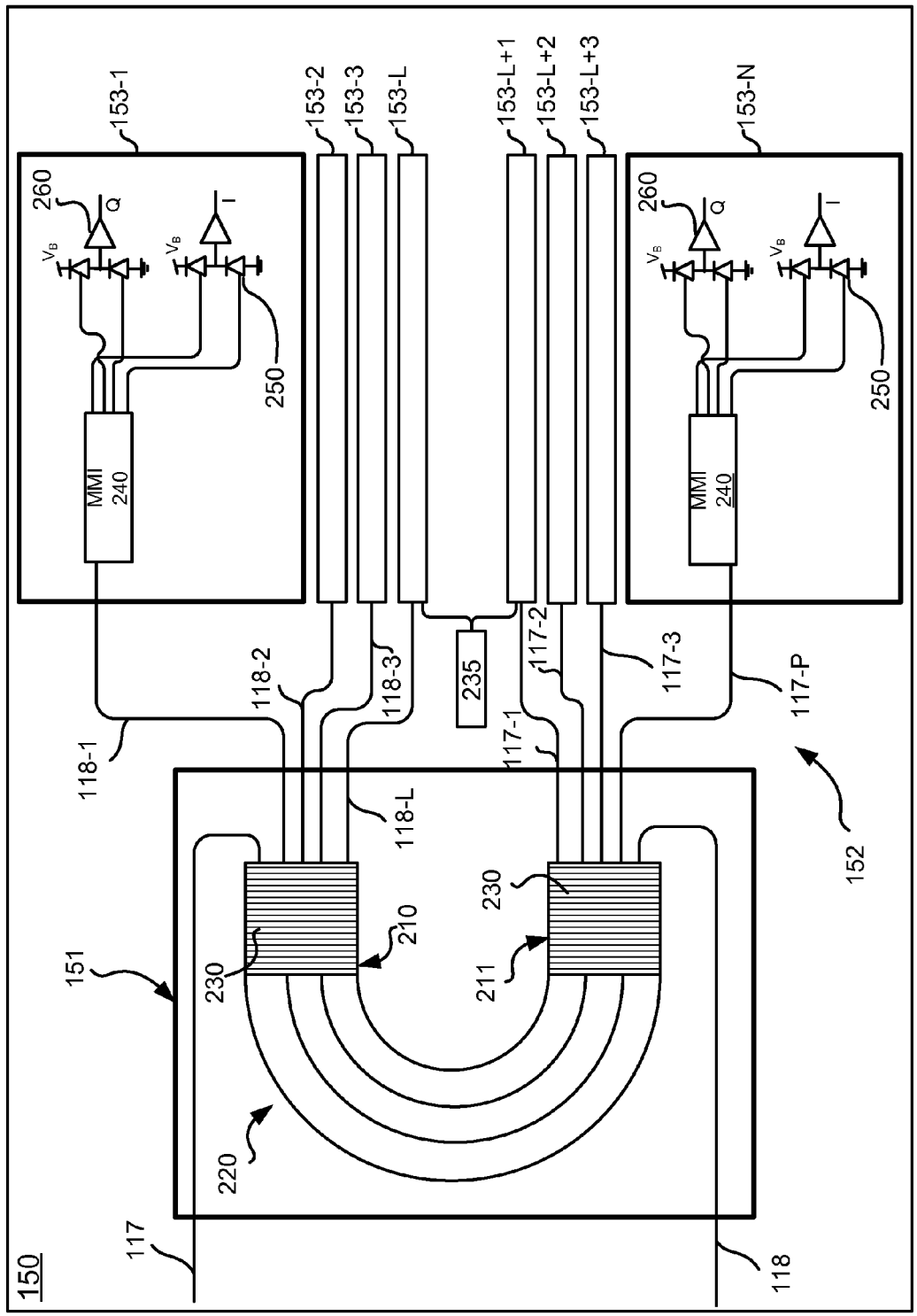
FIG. 2B is a diagram illustrating example components of a receiver module as shown in FIG. 1.

FIG. 2B is a diagram illustrating example elements of receiver module 150 as shown in FIG. 1. As shown in FIG. 2B, receiver module 150 may include optical demultiplexer 151, waveguides 152, local oscillator 235, and/or optical receivers 153. Optical demultiplexer 151 may include slab 210, slab 211, and/or waveguides 220 connected to slabs 210 and 211. In some implementations, slabs 210 and 211 may each include an input and an output. For example, slab 210 may receive an input (e.g., optical signal 117) and slab 211 may receive an input (e.g., optical signal 118). Waveguides 220 may supply slab 210 with output signal channels associated with the input of slab 211. Further, waveguides 220 may supply slab 211 with output signal channels associated with the input of slab 210.

In some other implementations, slab 210 and/or slab 211 may include an input, but may not include an output. Alternatively, slab 210 and/or slab 211 may include an output, but may not include an input. For example, slab 210 may include an input to receive optical signal 117 (e.g., from optical multiplexer 114). Slab 211 may include an output to supply signal channels associated with the input of slab 210. Alternatively, slab 211 may include an input to receive optical signal 118 (e.g., from optical multiplexer 114). Slab 210 may include an output to supply a signal channels associated with the input of slab 211.

While the implementations may be described as optical demultiplexer 151 receiving optical signals 117 and 118 provided by optical multiplexer 114 (e.g., WDM signals), in practice, it will be apparent that optical signals 117 and 118 may correspond to any type of optical signal. For example, optical signals 117 and 118 may refer to optical signals provided by a polarization beam splitter, a rotator, or some other optical device.

Slabs 210 and 211 may each include a free-space region (e.g., a propagation region). The free-space regions of slabs 210 and 211 may allow the wavelengths, associated with input signals, to propagate freely. Slab 210 may receive optical signal 117, thereby allowing wavelengths of optical signal 117 to propagate in the free-space region of slab 210. Waveguides 220 may guide individual signal channels associated with optical signal 117 and supply the individual signal channels to slab 211. Slab 211 may receive optical signal 118, thereby allowing wavelengths of optical signal 118 to propagate in the free-space region of slab 211. Waveguides 220 may guide individual signal channels, associated with optical signal 118, and supply the individual signal channels to slab 210.

As shown in FIG. 2B, slabs 210 and 211 may supply respective signal channels to optical receivers 153, via waveguides 152. Waveguides 152 may include individual waveguides associated with individual signal channels outputted by slabs 210 and 211. For example, waveguides 152 may include corresponding waveguides to transmit signal channels 118-1, 118-2, 118-3 . . . 118-L (where L≥1), associated with optical signal 118, to optical receivers 153-1, 153-2, 153-3 . . . 153-L, respectively. Additionally, waveguides 152 may include individual waveguides associated with individual signal channels associated with optical signal 117. For example, waveguides 152 may include corresponding waveguides to transmit signal channels 117-1, 117-2, 117-3 . . . 117-P (where P≥1), associated with optical signal 117, to optical receivers 153-L+1, 153-L+2, 153-L+3 . . . 153-N (where N≥1), respectively.

In some implementations, slab 210 and/or slab 211 may include material 230 (e.g., to form a polarizer on the respective slab). As described above, material 230 may absorb components of a signal channel, WDM signal, and/or some other optical signal having a particular polarization when the optical signal passes through the respective slab having material 230. For example, as described above, slabs 210 and 211 may receive optical signals 117 and 118 from optical multiplexer 114, and may supply corresponding signal channels. Material 230 may absorb components of the received WDM signals having a particular polarization (e.g., a TE or TM polarization). Further, material 230 may absorb components of the supplied corresponding signal channels having a particular polarization.

Local oscillator 235 may include a laser, a collection of lasers, or some other device. In some implementations, local oscillator 235 may include a laser to provide an optical signal to optical receivers 153. In some implementations, local oscillator 235 may include a single-sided laser to provide an optical signal to a coupler. In some other implementations, local oscillator 235 may include a double-sided laser to provide optical signals to respective optical receivers 153. Receiver module 120 may include multiple local oscillators 235, to provide optical signals to respective optical receivers 153.

Local oscillator 235 may provide a coherent detection system for optical receivers 153 (e.g., to allow optical receivers 153 to reconstruct a received optical signal having crosstalk or dispersion). For example, local oscillator 235 may provide optical receiver 153-L with a phase reference signal, such that optical receiver 153-L may reconstruct a received signal (e.g., signal channel 118-L supplied by optical demultiplexer 151) that may include linear crosstalk and/or dispersion.

As further shown in FIG. 2B, optical receivers 153 may each include multi-mode interference (MMI) coupler 240, photodiodes 250, and transimpedence amplifiers (TIAs) 260. Additionally, or alternatively, optical receivers 153 may include additional, fewer, or differently arranged components than shown in FIG. 2B.

MMI coupler 240 may include an optical device to receive a signal channel supplied by optical demultiplexer 151 and/or an optical signal from local oscillator 235. In some implementations, MMI coupler 240 may supply multiple signals associated with the received signal channel and optical signal to photodiodes 250.

Photodiodes 250 may include an optical device to receive optical outputs from MMI coupler 240 and convert the optical outputs to corresponding electrical signals. In some implementations, photodiodes 250 may be arranged in pairs and connected to one another in a balanced configuration. The output of each balanced pair may supply one of a quadrature (Q) or in-phase (I) electrical signal, which is amplified by one of TIAs 260.

TIAs 260 may include an amplifier device, or some other device. In some implementations, TIAs 260 may receive electrical signals from photodiodes 250. TIAs 260 may amplify quadrature (Q), in-phase (I), and/or some other type of electrical signal.

While particular components are of receiver module 150 are shown in FIG. 2B, in practice, the example implementations of receiver module 150, shown in FIG. 2B, may include additional elements, fewer elements, or differently arranged elements than are shown in FIG. 2B.

Figure 3A:
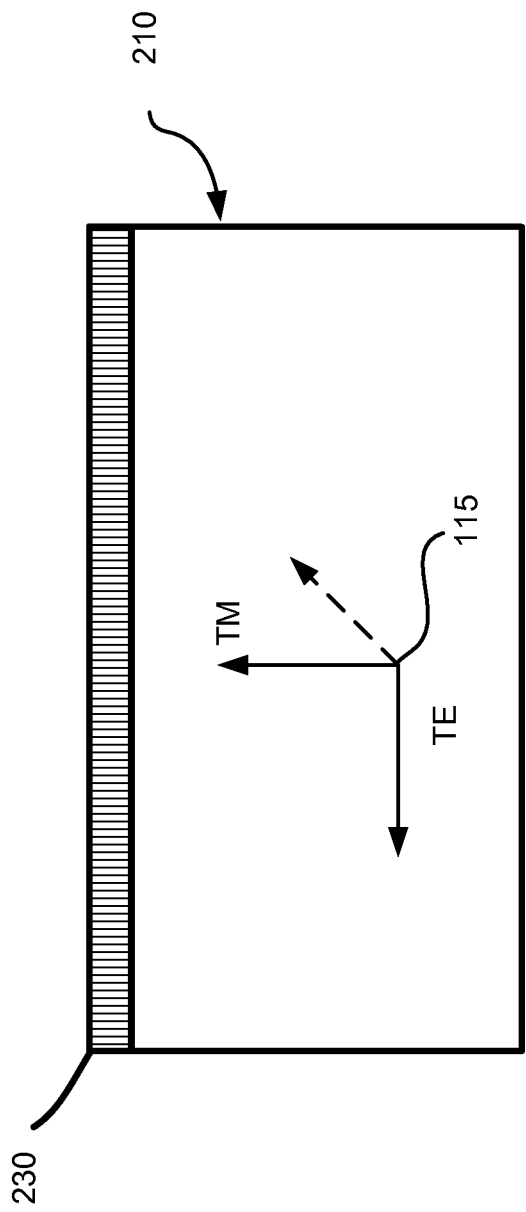
FIGS. 3A-3B are a diagram illustrating a front view of a slab for a multiplexer or demultiplexer as shown in FIGS. 2A-2B.

FIG. 3A is a diagram illustrating a front view of slab 210 for optical multiplexer 114 or optical demultiplexer 151 as shown in FIGS. 2A-2B. Slab 210 may include a layer of material 230 provided on the top surface of slab 210 and having a thickness. In some implementations, slab 210 may function as a TE polarizer and may absorb components having a TM polarization.

As shown in FIG. 3A, slab 210 may receive optical signal 115. Optical signal 115 may include first components having a first polarization (e.g., a TM polarization), and second components having a second polarization (e.g., a TE polarization).

As shown in FIG. 3A, the direction of the electric field of components having the TM polarization may be substantially vertical as optical signal 115 passes through slab 210. The direction of the electric field of components having the TE polarization may be substantially horizontal as optical signal 115 passes through slab 210. The components of optical signal 115 having the TM polarization may contact material 230, thereby causing material 230 to absorb components having the TM polarization. As a result, components having the TM polarization may be absorbed while components having the TE polarization pass through slab 210.

While the example implementation of FIG. 3A is described in terms of slab 210 receiving optical signal 115, it will be apparent that the example implementation may apply to slab 210 receiving some other optical signal (e.g., optical signal 116, signal channel 115-1, signal channel 116-1, etc.) and may apply to slab 211 receiving an optical signal (e.g., optical signal 115, optical signal 116, signal channel 115-1, signal channel 116-1, etc.).

Figure 3B:
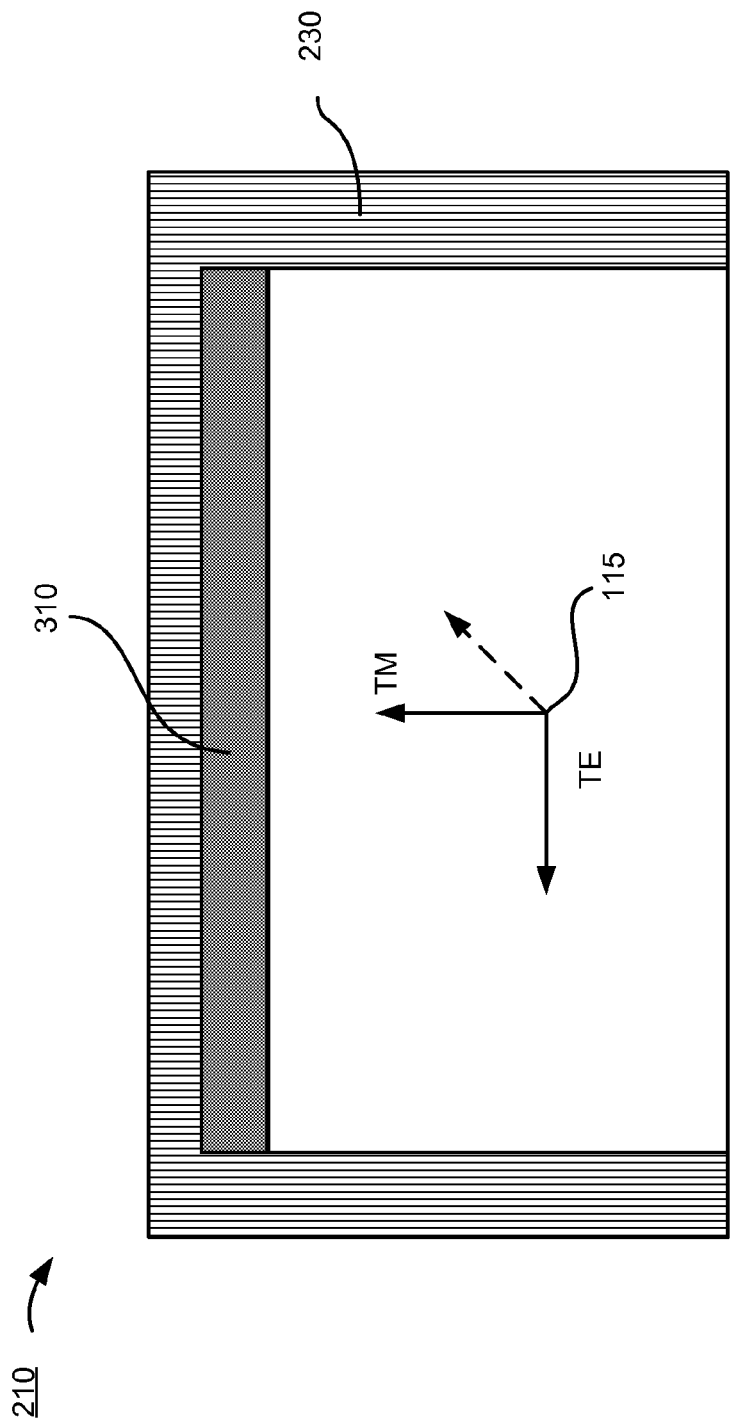

FIG. 3B is a diagram illustrating a front view of a slab for optical multiplexer 114 or optical demultiplexer 151 as shown in FIGS. 2A-2B. In some implementations, slab 210 may function as a TM polarizer and may absorb components having a TE polarization. For example, slab 210 may include a layer of material 230 having a thickness formed on a top surface and/or side surfaces of slab 210 to absorb components having a TE polarization. Slab 210 may also include material 810 having a thickness formed directly beneath material 230 on a top surface of slab 210. In some implementations, material 810 may include a nitride and/or some other material, to prevent components having the TM polarization from contacting material 230.

As shown in FIG. 3B, slab 210 may receive optical signal 115. Optical signal 115 may include first components having a first polarization (e.g., a TM polarization), and second components having a second polarization (e.g., a TE polarization).

As further shown in FIG. 3B, the direction of the electric field of components having the TM polarization may be substantially vertical as optical signal 115 passes through slab 210. The direction of the electric field of components having the TE polarization may be substantially horizontal as optical signal 115 passes through slab 210. The components of optical signal 115 having the TE polarization may contact material 230, thereby causing material 230 to absorb components having the TE polarization. The components of optical signal 115 having the TM polarization may contact material 310, such that the components having the TM polarization may not contact material 230. As a result, components having the TE polarization may be absorbed while components having the TM polarization may pass through slab 210.

While the example implementation of FIG. 3B is described in terms of slab 210 receiving optical signal 115, it will be apparent that the example implementation may apply to slab 210 receiving some other optical signal (e.g., optical signal 116, signal channel 115-1, signal channel 116-1, etc.) and may apply to slab 211 receiving an optical signal (e.g., optical signal 115, optical signal 116, signal channel 115-1, signal channel 116-1, etc.).

Figure 4:
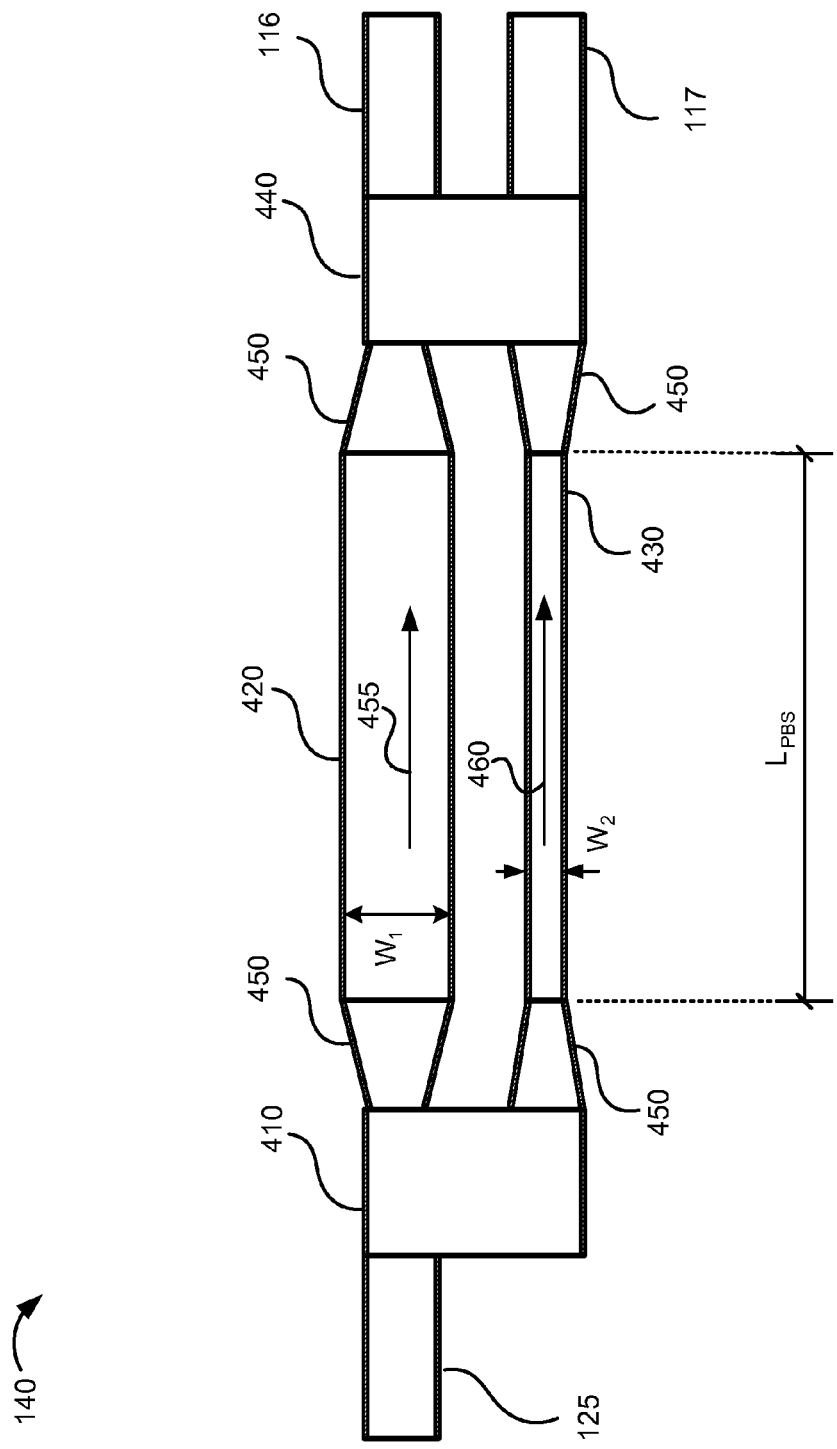
FIG. 4 is a diagram of a polarization beam splitter (PBS) as shown in FIG. 1.

FIG. 4 is a diagram of a PBS as shown in FIG. 1. As shown in FIG. 4, PBS 140 may include coupler 410, first waveguide 420, second waveguide 430, and coupler 440. In some implementations, coupler 410 may be provided on a first end of PBS 140, coupler 440 may be provided at a second of PBS 140, and first waveguide 420 and second waveguide 430 may be provided in between coupler 410 and coupler 440 to connect coupler 410 and coupler 440. In some implementations, coupler 410 and coupler 440 may include a directional coupler, an MMI coupler, or some other type of coupler.

In some implementations, first waveguide 420 and second waveguide 430 may each include one or more tapered sections 450 provided on respective ends of first waveguide 420 and second waveguide 430. In some implementations, first waveguide 420 may include a first width (e.g., W1) and second waveguide 430 may include a second width (W2). As shown in FIG. 4, W1 may be greater than W2. Alternatively, W2 may be greater than W1, or W1 and W2 may be of equal value. As further shown in FIG. 4, first waveguide 420 and second waveguide 430 may have a common length, (e.g., $L_{PBS}$). Alternatively, first waveguide 420 and second waveguide 430 may have different lengths.

In some implementations, coupler 410 may include an input to receive an optical signal (e.g., optical signal 125) or a multiple optical signals. In some implementations, optical signal 125 may include first components having a first polarization (e.g., a TM polarization) and second components having a second polarization (e.g., a TE polarization). Coupler 410 may split optical signal 125, and provide output optical signal 455 (i.e., a first portion of optical signal 125) to first waveguide 420, and output optical signal 460 (i.e., a second portion of optical signal 125) to second waveguide 430. In some implementations, output optical signal 455 may include the first components and the second components, and output optical signal 460 may include the first components and the second components.

In some implementations, first waveguide 420 may receive output optical signal 455 via tapered section 450 such that tapered section 450 may minimize loss and/or prevent reflection of output optical signal 455 when first waveguide 420 receives output optical signal 455. In some implementations, first waveguide 420 may have a width (i.e., W1) that induces interference between the first components and the second components of output optical signal 455. For example, for a particular width of first waveguide 420, the first components may be associated with a first index value and the second components may be associated with a second index value that is different than the first index value.

In some implementations, the first components and the second components may interfere as a result of the difference between the first index value and the second index value. For example, the speed at which the first components travel through first waveguide 420 may be inversely proportional to the first index value and the speed at which the second components travel through first waveguide 420 may be inversely proportional to the second index value. As a result of the difference between the first index value and the second index value, the first components may travel at a different speed than the second components, thereby causing interference between the first components and the second components when the first components and the second components meet at coupler 440.

In some implementations, second waveguide 430 may receive output optical signal 460 via tapered section 450 such that tapered section 450 may minimize loss and/or prevent reflection of output optical signal 460 when second waveguide 430 receives output optical signal 460. In some implementations, second waveguide 430 may have a width (i.e., W2) that may be narrower than the width of first waveguide 420 (i.e., W1). The difference in widths between W1 and W2 may relate to a difference in index values between W1 and W2.

As described above, first waveguide 420 and second waveguide 430 may have a length (e.g., $L_{PBS}$) based on the difference between the widths W1 and W2. The length may be such that the first components of output optical signal 455 are outputted to coupler 440 and the second components of output optical signal 460 are outputted to coupler 440 via a phase shift (e.g., an approximately 180-degree phase shift) between output optical signal 455 and output optical signal 460. For example, assume that, for a particular width of W1, first waveguide 420 is associated with an index value of 3.0. Further assume that, for a particular width of W2, second waveguide 430 is associated with an index value of 3.1. As a result, output optical signal 455 may travel through first waveguide 420 faster than output optical signal 460 travels through second waveguide 430. First waveguide 420 and second waveguide 430 may have a length such that first waveguide 420 supplies coupler 440 with the first components of output optical signal 455 and second waveguide 430 supplies coupler 440 with the second components of output optical signal 460 (e.g., as a result of a phase shift between output optical signal 455 and output optical signal 460 caused by the difference in indices associated with output optical signal 455 and output optical signal 460).

In some implementations, coupler 440 may receive the first components of output optical signal 455 and may receive the second components of output optical signal 460. Coupler 440 may form optical signal 116 having the first components of output optical signal 455 and optical signal 117 having the second components of output optical signal 460. In some implementations, coupler 440 may include a first output to supply optical signal 116 and may include a second output to supply optical signal 117. As a result, PBS 140 may receive an input optical signal (e.g., optical signal 125) having the first components and the second components, and may supply a first output optical signal (e.g., optical signal 116) having the first components and a second output optical signal (e.g., optical signal 117) having the second components.

While PBS 140 is shown as having a particular arrangement of elements in FIG. 4, PBS 140 may include a different arrangement of elements.

Figure 5:
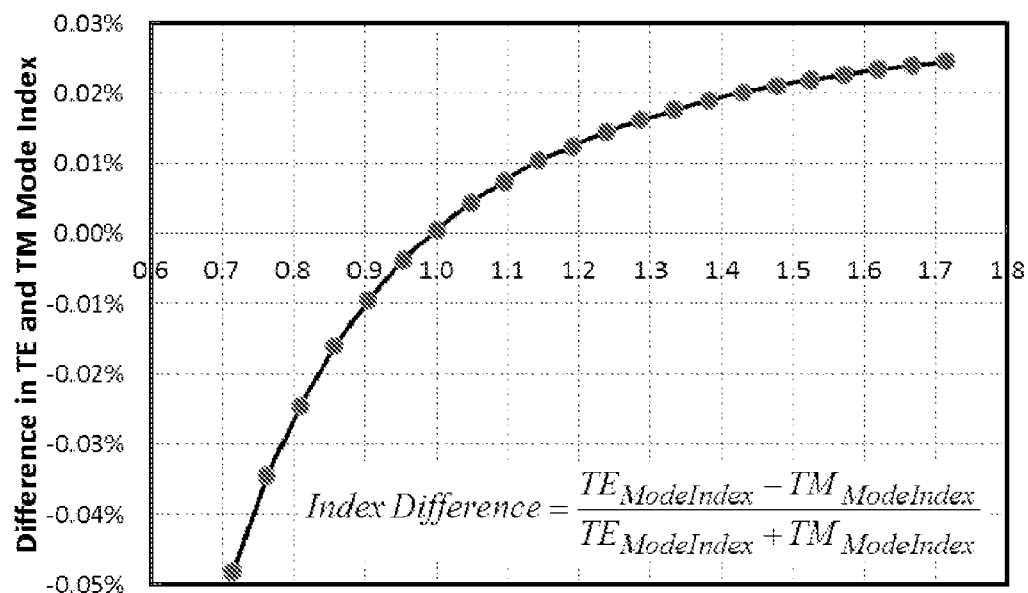
FIG. 5 is a graph of index differences by polarization type and waveguide width.

FIG. 5 is a graph of index differences by polarization type and waveguide width. In some implementations, index differences may be determined based on the equation: Index difference=$(TE_{ModeIndex}-TM_{ModeIndex})/(TE_{ModeIndex}+TM_{ModeIndex})$ where $TE_{ModeIndex}$ is an index associated with components having the TE polarization and $TM_{ModeIndex}$ is an index associated with components having the TM polarization, As shown in FIG. 5, the difference in indices increases as waveguide width gets larger. For example, the index difference may be 0% for a "normalized waveguide width" (e.g., a particular waveguide width multiplied by a factor) of 1.0, whereas the index difference may increase to approximately 0.025% for a normalized waveguide width of 1.7.

As described above, the index differences, shown in FIG. 5, may correspond to a phase shift caused between first components (e.g., components having the TM polarization) and second components (e.g., components having the TE polarization) when two optical signals, each having both the first components and the second components, travel through respective waveguides (e.g. first waveguide 420 and second waveguide 430) and meet at a coupler, (e.g., coupler 440).

While the graph in FIG. 5 illustrates particular values associated with indices by polarization type and normalized waveguide width, in practice, the values associated with the indices may be different than what is shown in FIG. 5.

Figure 6:
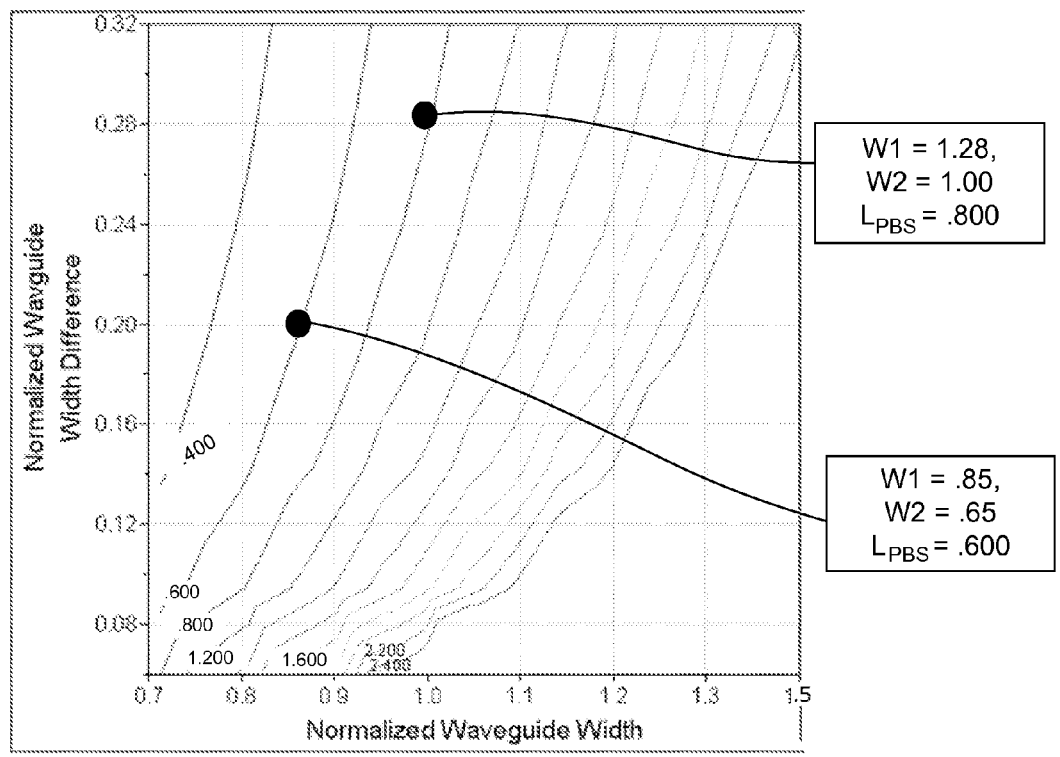
FIG. 6 is a graph of possible lengths associated with components of a PBS as shown in FIG. 1.

FIG. 6 is a graph of possible lengths of $L_{PBS}$. In FIG. 6, assume that W1 is greater than W2. As shown in FIG. 6, normalized lengths (e.g., particular lengths multiplied by a factor) of $L_{PBS}$ may be determined based on a difference between normalized waveguide widths of W1 and W2 for varying widths of W2. In one example implementation, assume that W2 has a normalized waveguide width of 1.00 and that the difference between normalized waveguide widths of W2 and W1 is 0.28 (i.e., the normalized waveguide width of W1 is 1.28). As shown in FIG. 6, the normalized length of $L_{PBS}$ may be equal to approximately 0.800. In another example, $L_{PBS}$ may have a normalized length of approximately 0.600 when the normalized width of W2 is 0.65 and the normalized width of W1 is 0.85. In some implementations, a desired normalized width of W1 or W2 may be selected such that each of W1 or W2 is not wide enough to become multimoded, but is not narrow enough as to cause an undesirable loss of an optical signal when the optical signal passes through the waveguide.

In some implementations, a desired width for W1 may be selected as described above (e.g., based on a difference between a first index value associated with components having the TE polarization and a second index value associated with components having the TM polarization). In some implementations different lengths of $L_{PBS}$ may be determined for different widths of W2 based on information shown in the graph of FIG. 6.

While the graph in FIG. 6 illustrates particular normalized lengths of $L_{PBS}$, in practice, $L_{PBS}$ may have different lengths for different normalized widths W1 and W2 than what are shown in FIG. 6.

Figure 7:
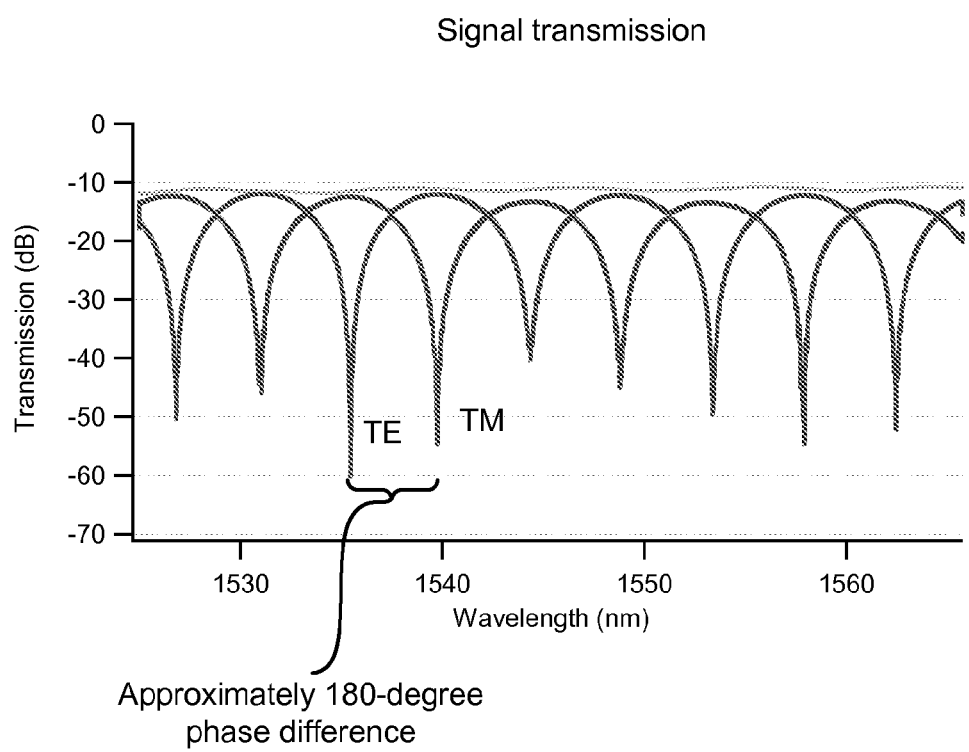
FIG. 7 is a graph illustrating example transmission characteristics of an optical signal received by a PBS.

FIG. 7 is a graph illustrating example transmission characteristics of an optical signal received by PBS 140. In FIG. 7, assume that an optical signal is received by PBS 140 having a particular $L_{PBS}$ length and a particular difference between W1 and W2 widths. As shown in FIG. 7, PBS 140 may induce an approximately 180-degree phase difference between first components having the TM polarization and second components having the TE polarization when PBS 140 receives the optical signal having the first components and the second components.

While the graph in FIG. 7 illustrates a particular example of transmission characteristics of an optical signal received by PBS 140 having a particular length and a particular difference in waveguide widths, in practice, the transmission characteristics may be different than what are shown and may be different for a PBS 140 having a different length and different difference in waveguide widths than what is shown in FIG. 7.

As described above, PBS 140 may provide two optical signals, associated with a single input optical signal, to one or more optical components (e.g., a rotator, a demultiplexer, etc.) thereby increasing capacity for an associated receiver module of the PBS. Further, the size of PBS 140 may be reduced based on reducing the length of $L_{PBS}$ based on the difference between W1 and W2.

The foregoing description provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise. Also, any reference to components having a Transverse Electric (TE) polarization may also apply to components having a Transverse Magnetic (TM) polarization.

What is claimed is:

1. An optical system, comprising:
  a polarization beam splitter having:
    a first end having a first coupler with an input configured to receive a plurality of optical signals, each of the plurality of optical signals having a corresponding one of a plurality of wavelengths;
    a second end having a second coupler with a first output and a second output,
      the first output providing first components of the plurality of optical signals, each of the first components having a first polarization, and
      the second output providing second components of the plurality of optical signals, each of the second components having a second polarization; and
    a first waveguide and a second waveguide,
      each of the first waveguide and the second waveguide having:
        a first end connected to the first coupler, and
        a second end connected to the second coupler, and
      the first waveguide having a first width and the second waveguide having a second width,
      the first waveguide and the second waveguide each having a respective length corresponding to a difference between the first width and the second width,
      the first waveguide and the second waveguide being configured to induce a phase shift of the plurality of optical signals based on the first width, the second width, and the respective lengths of the first waveguide and the second waveguide,
      the second end of the polarization beam splitter being configured to provide the first components, via the first output, and the second components, via the second output, in accordance with the phase shift of the plurality of optical signals induced by the first waveguide and the second waveguide;
  a rotator including:
    an input that receives the first components,
    the rotator being configured to rotate the first polarization so that each of the first components has the second polarization, the rotator outputting the first components as rotated first components; and
  an optical circuit including:
    a substrate;
    a first path and a second path provided on the substrate,
      the first path receiving the rotated first components and the second path receiving the second components; and
    an optical multiplexer circuit or an optical demultiplexer circuit provided on the substrate,
      the first path providing the rotated first components to the optical multiplexer circuit or the optical demultiplexer circuit, and
      the second path providing the second components to the optical multiplexer circuit or the optical demultiplexer circuit,
    where the optical multiplexer circuit or the optical demultiplexer circuit includes:
      a first slab to receive the rotated first components and a second slab to receive the second components,
        the rotated first components including residual components having the first polarization,
        the second components including the residual components having the first polarization; and
      a layer of material provided on at least one of the first slab or the second slab, the layer of material having a thickness such that the residual components, associated with the first polarization, are absorbed by the material and the components associated with the second polarization pass through the at least one of the first slab or the second slab.

2. The optical system in accordance with claim 1, where the first components are associated with a first index value and the second components are associated with a second index value,
    where the first width is based on a difference between the first index value and the second index value.

3. The optical system in accordance with claim 2, where each of the first index value and the second index value is a function of the first width.

4. The optical system in accordance with claim 1, where the phase shift is approximately a 180-degree phase shift.

5. The optical system in accordance with claim 1, where the respective lengths are equal.

6. The optical system in accordance with claim 1, where the respective lengths are different.

7. The optical system in accordance with claim 1, where the first polarization is a transverse electric (TE) polarization and the second polarization is a transverse magnetic (TM) polarization.

8. The optical system in accordance with claim 1, where the first polarization is a transverse magnetic (TM) polarization and the second polarization is a transverse electric (TE) polarization.

* * * * *